(12) United States Patent
Chen et al.

(10) Patent No.: US 8,805,988 B2
(45) Date of Patent: Aug. 12, 2014

(54) AGER RING OPTIMIZATION

(75) Inventors: Tian Chen, Beijing (CN); Jane Wu, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 359 days.

(21) Appl. No.: 13/371,178

(22) Filed: Feb. 10, 2012

(65) Prior Publication Data

US 2012/0144012 A1    Jun. 7, 2012

Related U.S. Application Data

(63) Continuation of application No. 12/732,268, filed on Mar. 26, 2010, now Pat. No. 8,140,656.

(51) Int. Cl.

| | | |
|---|---|---|
| *G06F 15/173* | (2006.01) | |
| *G06F 21/00* | (2013.01) | |
| *H04J 3/06* | (2006.01) | |
| *G06F 11/00* | (2006.01) | |
| *H04L 29/06* | (2006.01) | |
| *G06F 9/50* | (2006.01) | |
| *H04L 29/08* | (2006.01) | |

(52) U.S. Cl.
CPC .............. *G06F 9/5022* (2013.01); *H04L 69/28* (2013.01); *H04L 67/145* (2013.01)
USPC .............. 709/223; 713/185; 370/350; 714/55

(58) Field of Classification Search
USPC ......................................................... 709/223
See application file for complete search history.

(56) References Cited

U.S. PATENT DOCUMENTS

| | | | |
|---|---|---|---|
| 6,791,949 B1 | 9/2004 | Ryu et al. | |
| 7,478,245 B2 * | 1/2009 | Allen | 713/185 |
| 7,716,380 B1 | 5/2010 | Wang et al. | |
| 8,214,492 B2 * | 7/2012 | Chauvin et al. | 709/224 |
| 2003/0037294 A1 * | 2/2003 | Robsman et al. | 714/55 |
| 2005/0055399 A1 | 3/2005 | Savchuk | |
| 2006/0031553 A1 * | 2/2006 | Kim | 709/231 |
| 2006/0133393 A1 * | 6/2006 | Yun | 370/401 |
| 2007/0043605 A1 * | 2/2007 | Fisher et al. | 705/9 |
| 2007/0250863 A1 * | 10/2007 | Ferguson | 725/46 |
| 2008/0133467 A1 * | 6/2008 | Davis et al. | 707/2 |
| 2008/0239957 A1 | 10/2008 | Tokura et al. | |
| 2009/0207742 A1 | 8/2009 | Suzuyama et al. | |
| 2009/0238179 A1 | 9/2009 | Samprathi | |
| 2009/0328186 A1 * | 12/2009 | Pollutro et al. | 726/13 |
| 2010/0202436 A1 * | 8/2010 | Albert et al. | 370/350 |
| 2011/0149969 A1 | 6/2011 | Beecroft et al. | |
| 2011/0238804 A1 | 9/2011 | Chen et al. | |

\* cited by examiner

*Primary Examiner* — Brian P Whipple
*Assistant Examiner* — James Edwards
(74) *Attorney, Agent, or Firm* — Harrity & Harrity, LLP

(57) ABSTRACT

A device provides an ager ring that ages entries associated with managed resource of a device, and determines whether a particular entry associated with a particular managed resource of the device is to be updated. The device also updates, when the particular entry is to be aged out in a particular time frame, the particular entry in the ager ring based on a bucket offset and a current time bucket associated with the particular entry and based on a current time, a refresh timeout, and a maximum timeout associated with the ager ring. The device further updates, when the particular entry is being aged during processing, the particular entry in the ager ring based on a new bucket, the current time bucket, and the bucket offset associated with the particular entry and based on the maximum timeout associated with the ager ring.

20 Claims, 10 Drawing Sheets

AGER RING OPTIMIZATION

RELATED APPLICATION

This application is a continuation of U.S. patent application Ser. No. 12/732,268, filed Mar. 26, 2010, which is incorporated herein by reference.

BACKGROUND

Computing and communication networks typically include network devices, such as routers, firewalls, switches, servers, or gateways, which transfer or switch data, such as packets, from one or more sources to one or more destinations. Network devices may operate on the packets as the packets traverse the network, such as by forwarding or filtering the packet-based network traffic.

Some network devices (e.g., firewalls) utilize a ring-based aging mechanism (e.g., referred to as an "ager ring") to manage time expirations associated with resources (e.g., firewall sessions). When a time associated with a managed resource expires, the ager ring may delete the managed resource (e.g., delete the firewall session). When the ager ring accelerates a session expiration process, efficient refreshing of the session may be degraded. For example, if a continuous flow of packets are provided during a session, the session may continuously refresh. The ager ring may update the session from one position (e.g., time interval or bucket) of the ager ring to another position of the ager ring, for every packet that is received. For multithread-based network devices, such an arrangement may cause the ager ring to lock old and new positions of the ager ring prior to updating the session.

SUMMARY

According to one aspect, a method may be implemented by a device, and may include determining, by the device, whether an entry associated with a managed resource of the device is to be updated; and updating, by the device and when the entry is to be aged out in a particular time frame, the entry in an ager ring, associated with the device, based on a bucket offset and a current time bucket associated with the entry and based on a current time, a refresh timeout, and a maximum timeout associated with the ager ring.

According to another aspect, a device may include a memory to store a plurality of instructions and an ager ring. The device may also include a processor to execute instructions in the memory to determine whether an entry associated with a managed resource of the device is to be updated, and update, when the entry is to be aged out in a particular time frame, the entry in the ager ring based on a bucket offset and a current time bucket associated with the entry and based on a current time, a refresh timeout, and a maximum timeout associated with the ager ring.

According to still another aspect, a computer-readable memory device may store instructions executable by one or more processors. The computer-readable memory device may include one or more instructions for providing an ager ring that ages one or more entries associated with one or more managed resource of a device, and one or more instructions for determining whether a particular entry associated with a particular managed resource of the device is to be updated. The computer-readable memory device may also include one or more instructions for updating, when the particular entry is to be aged out in a particular time frame, the particular entry in the ager ring based on a bucket offset and a current time bucket associated with the particular entry and based on a current time, a refresh timeout, and a maximum timeout associated with the ager ring. The computer-readable memory device may further include one or more instructions for updating, when the particular entry is being aged during processing, the particular entry in the ager ring based on a new bucket, the current time bucket, and the bucket offset associated with the particular entry and based on the maximum timeout associated with the ager ring.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Implementations described herein may provide systems and/or methods that update an entry of an ager ring provided in a device, such as a network device. The systems and/or methods may reduce a time associated with an ager ring entry update by updating the entry if the entry is going to be aged out in a short time frame or if the entry is being processed for aging out. In one implementation, for example, the systems and/or methods may determine whether an entry associated a managed resource (e.g., a firewall session) of a device is to be updated. The systems and/or methods may determine that the entry is to be updated when the entry is being refreshed in an ager ring of the device or when the entry is being processed for aging out in the ager ring. If the managed resource is being refreshed, the systems and/or methods may update the entry in the ager ring (e.g., if the entry is to be aged out in a short time frame) based on a variety of parameters associated with the ager ring and/or the entry. If the entry is being aged during processing, the systems and/or methods may update the entry based on additional parameters associated with the ager ring and/or the entry.

Implementations described herein may reduce operations performed by the ager ring when refreshing an entry, especially for managed resources (e.g., such as sessions) where packets drive ager ring updates. For example, if there are one million active sessions and at least one packet every two seconds for each session, current systems would perform one million ager ring updates. However, in the same scenario, implementations described herein may reduce ager ring updates to zero.

The term "managed resource," as used herein is to be broadly construed to include any resource of a device (e.g., a network device) that may be managed by the device or by an ager ring provided in the device. For example, a managed resource may include a firewall session, an intrusion detection and prevention session, etc.

Exemplary Network

Figure 1:
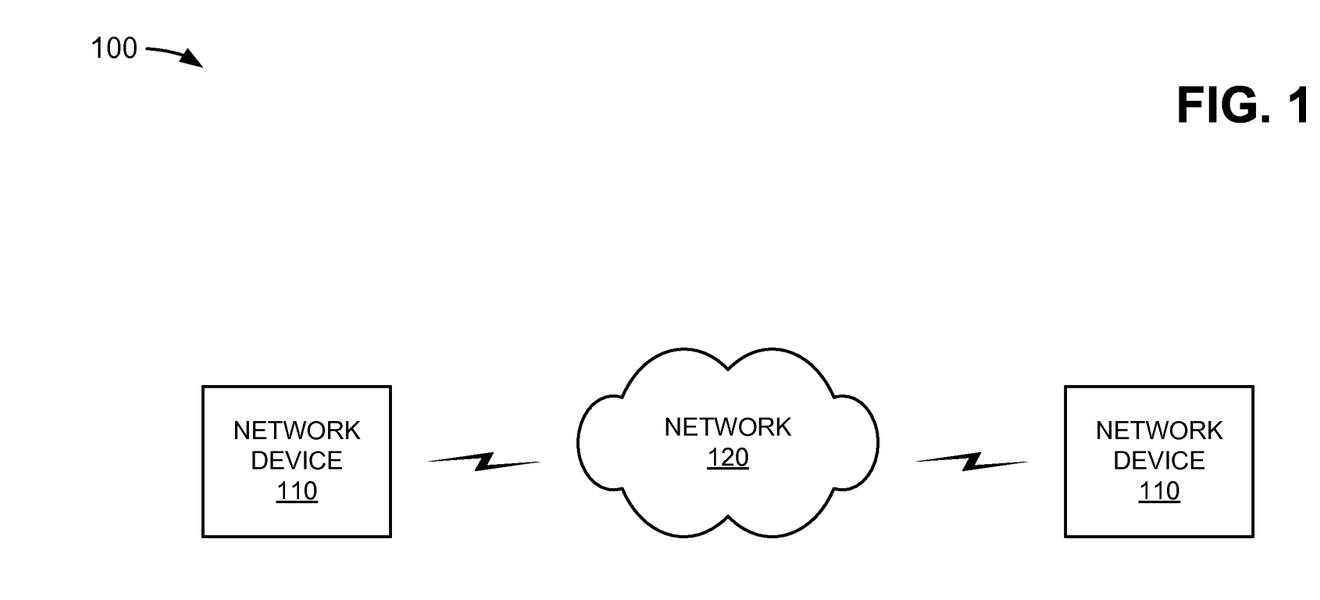
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include one or more network devices 110 interconnected by a network 120. Components of network 100 may interconnect via wired and/or wireless connections or links. Two network devices 110 and a single network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), a server device, or some other type of device that processes and/or transfers traffic. In an exemplary implementation, network device 110 may include a device that is capable of transmitting information to and/or receiving information from other network devices 110 via network 120.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Exemplary Network Device Configuration

Figure 2:
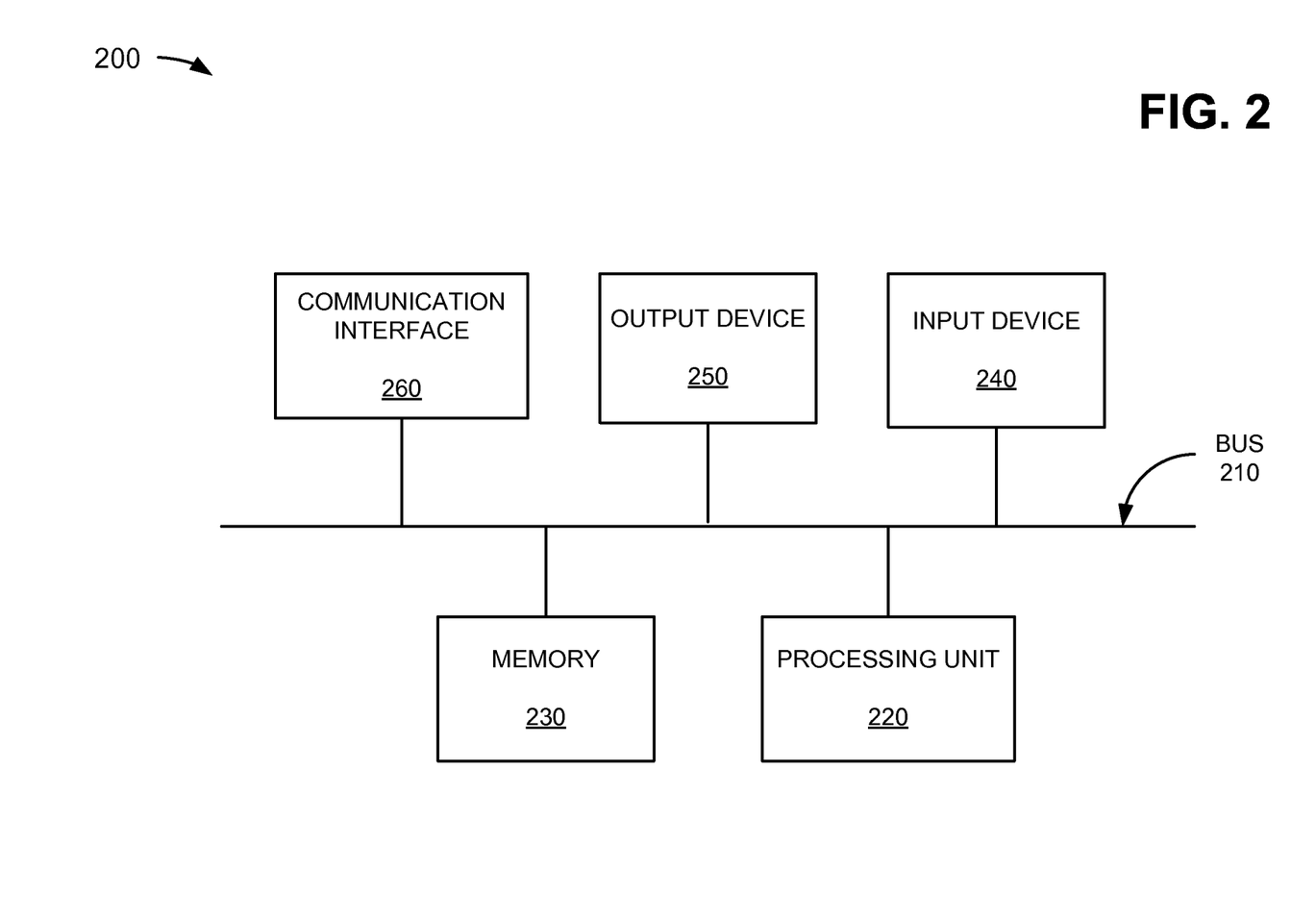
FIG. 2 is a diagram of exemplary components of a network device depicted in FIG. 1.

FIG. 2 illustrates a diagram of exemplary components of a device 200 that may correspond to one of network devices 110. As shown, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application-specific integrated circuits (ASICs), field-programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other network devices 110.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Exemplary Ager Ring Configuration/Operations

Figure 3:
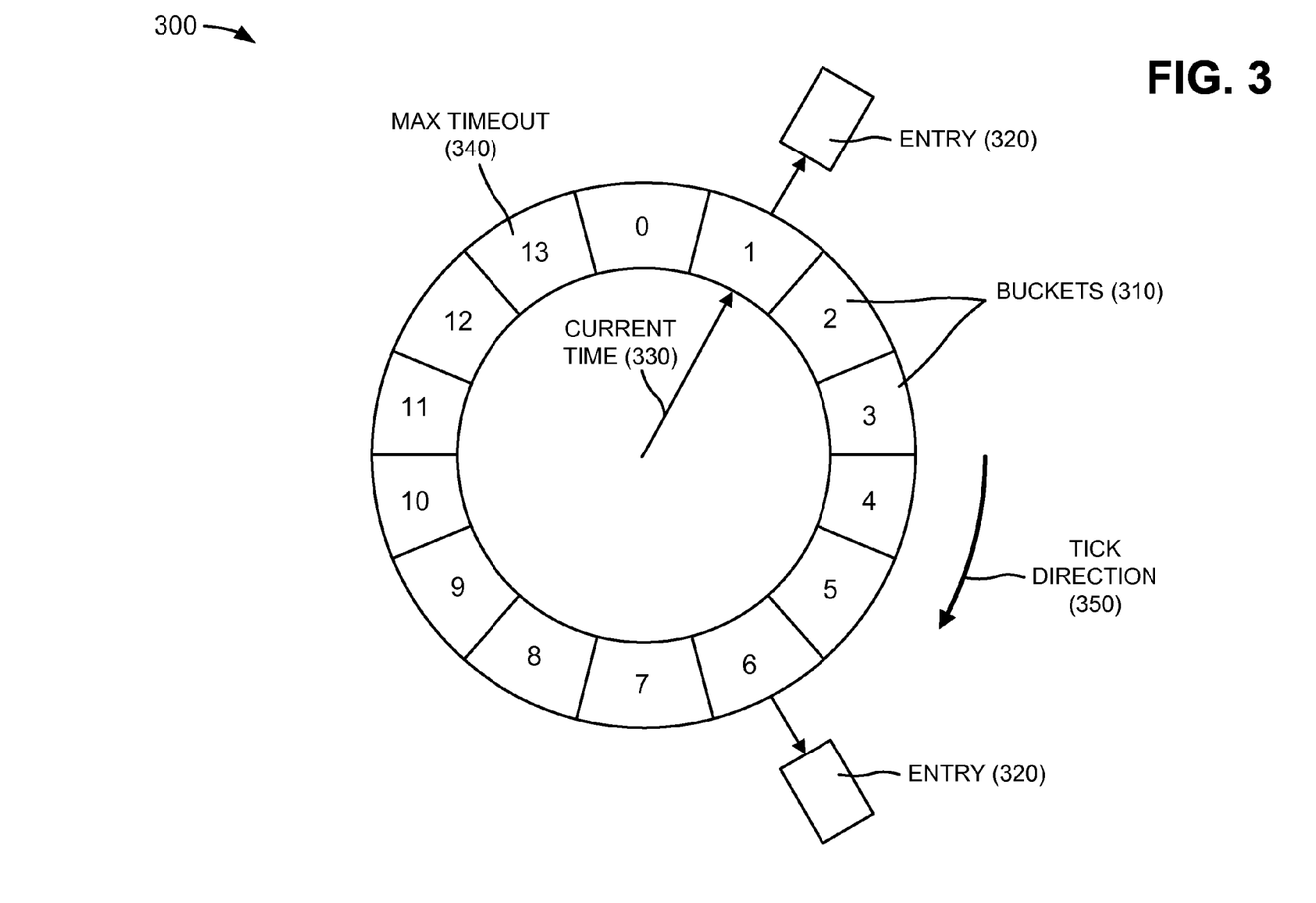
FIG. 3 is a diagram of an exemplary ager ring that may be implemented by the network device depicted in FIG. 1.

FIG. 3 is a diagram of an exemplary ager ring 300 that may be implemented by network device 110. Ager ring 300 may include an age-based mechanism for managing time expirations associated with resources (e.g., firewall sessions) provided by network device 110. When a time associated with a managed resource expires, ager ring 300 may delete the managed resource (e.g., delete the firewall session). In one implementation, ager ring 300 may be implemented via one or more components of device 200 (FIG. 2). As shown in FIG. 3, ager ring 300 may include multiple buckets 310 (e.g., labeled "0" through "13" provided in a clockwise arrangement); one or more entries 320; a current time 330 associated with ager ring 300; a maximum (max) timeout 340 associated with ager ring 300; and a tick direction 350 of ager ring 300.

Each bucket 310 may represent a time interval (e.g., in seconds, minutes, tens of seconds, etc.) associated with ager ring 300. Ager ring 300 may include any number of buckets 310. For example, as shown in FIG. 3, ager ring 300 may include fourteen (14) buckets 310 labeled "0" to "13" in a clockwise arrangement.

Each entry 320 may include one or more information elements (e.g., packets received during a session) associated with a managed resource (e.g., a firewall session) of network device 110. The term "packet," as used herein, is intended to be broadly construed to include a frame, a datagram, a packet, or a cell; a fragment of a frame, a fragment of a datagram, a fragment of a packet, a fragment of a cell; or another type, arrangement, or packaging of data. One or more entries 320 may be associated with a particular bucket 310 of ager ring 300. For example, as shown in FIG. 3, one entry 320 may be associated with bucket 310 labeled "1" (e.g., time interval "1") and another entry 320 may be associated with bucket 310 labeled "6" (e.g., time interval "6").

Current time 330 may include a current time associated with ager ring 300 (i.e., an "age" of ager ring 300 since its last refresh). For example, as shown in FIG. 3, current time 330 may be located at time interval "1" (e.g., bucket 310). Max timeout 340 may include a maximum amount of time before ager ring 300 times out. For example, as shown in FIG. 3, max timeout 340 may occur at time interval "13" (e.g., bucket 310). Tick direction 350 may include a direction (e.g., a clockwise direction) that current time 330 moves along ager ring 300.

In an exemplary implementation, network device 110 may determine whether an entry (e.g., entry 320) associated with a managed resource (e.g., a firewall session) of network device 110 is to be updated. If entry 320 is not to be updated, network device 110 may wait a particular time period and once again determine whether the entry is to be updated. Network device 110 may determine that entry 320 is to be updated when entry 320 is being refreshed in ager ring 300 (e.g., when entry 320 is going to be aged out in a particular time period) or when entry 320 is being processed for aging out in ager ring 300.

If entry 320 is being refreshed in ager ring 300 (e.g., packets are being received during a session), network device 110 may calculate a bucket offset of entry 320 according to Equation (1):

$$\text{Bucket Offset} = \text{Current Time} + \text{Refresh Timeout} - \text{Current Bucket}, \quad (1)$$

where "Refresh Timeout" may include a time period until an entry in ager ring 300 is refreshed, and "Current Bucket" may include a particular bucket 310 (e.g., a time value) associated with entry 320. For example, entries 320 shown in FIG. 3 may be associated with "Current Buckets" (e.g., time values) of "1" and "6." If "Current Bucket" is less than "Current Time," network device 110 may determine "Current Bucket" to be the sum of "Current Bucket" and max timeout 340.

If the "Bucket Offset" calculated in Equation (1) is less than zero (0), network device 110 may update a position of entry 320 in ager ring 300 to a position according to Equation (2), and may set the "Bucket Offset" of entry 320 to zero (0) (e.g., since entry 320 is updated).

$$(\text{Current Time} + \text{Refresh Timeout}) \% \text{ Max Timeout}. \quad (2)$$

The "%" sign provided in Equation (2) may include a remainder operator provided in modular arithmetic. Modular arithmetic (e.g., also called "clock arithmetic") is a system of arithmetic for integers, where numbers wrap around after they reach a certain value or "modulus." For example, an expression "14% 12" (or 14 (mod 12)) may provide a remainder of "2."

If the "Bucket Offset" calculated in Equation (1) is greater than or equal to zero (0), network device 110 may use Equation (3) to determine whether a remaining time (e.g., Current Bucket−Current Time) of entry 320 is greater than a particular amount of the "Refresh Timeout."

$$(\text{Current Bucket} - \text{Current Time}) \times 4 > \text{Refresh Timeout}. \quad (3)$$

In one example, the number four (4) provided in Equation (3) may be configurable (e.g., by network device 110 or a user of network device 110). If the remaining time of entry 320 is greater than the "Refresh Timeout," network device 110 may determine that entry 320 does not need to be updated, and may record the "Bucket Offset" of entry 320. If the remaining time of entry 320 is less than or equal to the "Refresh Timeout," network device 110 may proactively update entry 320 according to Equation (2), and may set the "Bucket Offset" of entry 320 to zero (0).

If entry 320 is being processed for aging out in ager ring 300 and the "Bucket Offset" of entry 320 is not equal to zero (0), network device 110 may update a position of entry 320 in ager ring 300 to a position (e.g., a "New Bucket") calculated according to Equation (4).

$$\text{New Bucket} = (\text{Current Bucket} + \text{Bucket Offset}) \% \text{ Max Timeout}. \quad (4)$$

After updating entry 320 to "New Bucket," network device 110 may set the "Bucket Offset" of entry 320 to zero (0). If entry 320 is being processed for aging out in ager ring 300 and the "Bucket Offset" of entry 320 equals zero (0), network device 110 may remove entry 320 from ager ring 300.

Although FIG. 3 shows exemplary components of ager ring 300, in other implementations, ager ring 300 may contain fewer components, different components, differently arranged components, or additional components than depicted in FIG. 3.

Figure 4:
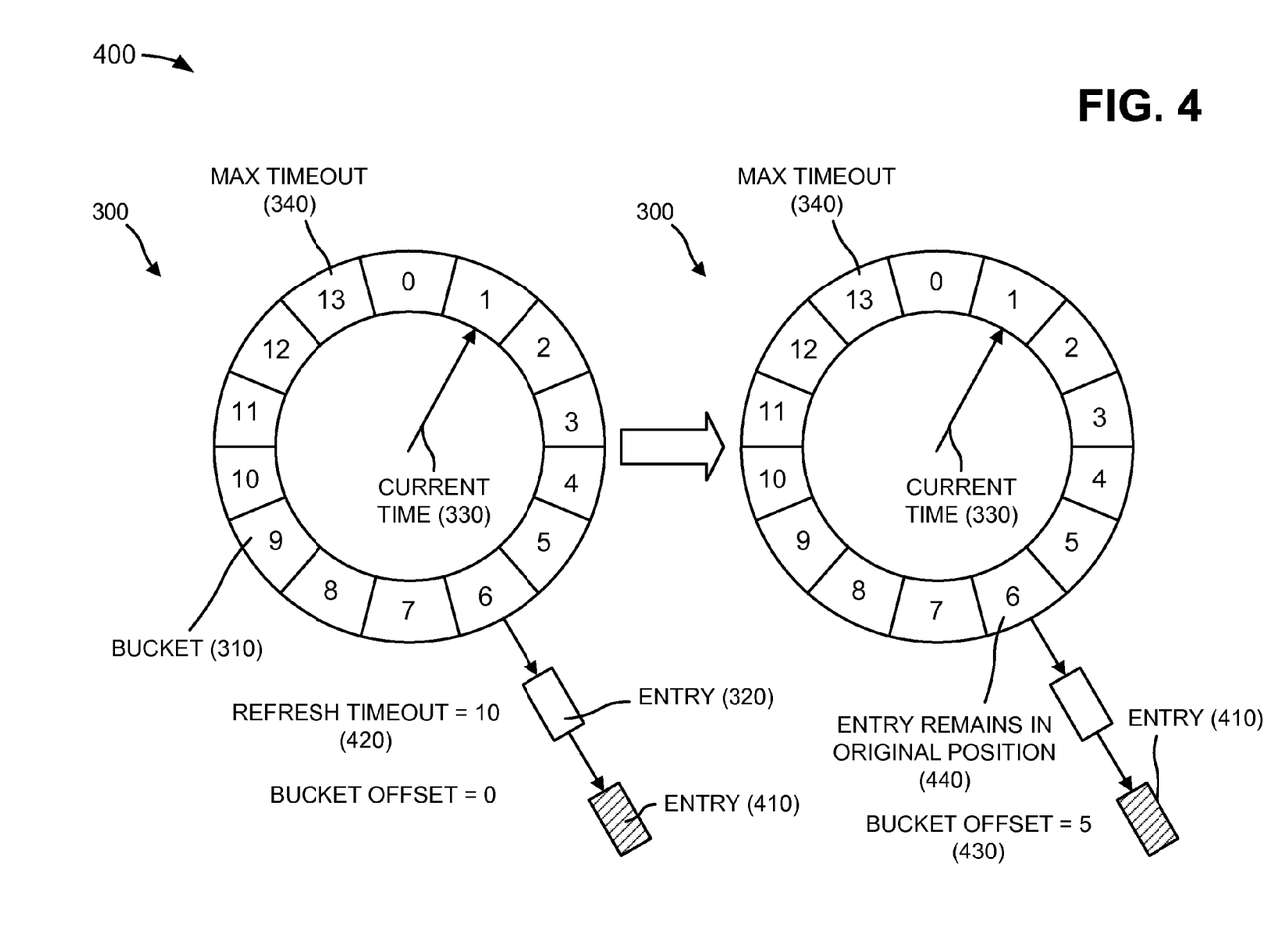
FIG. 4 is a diagram of exemplary operations capable of being performed by the ager ring when an entry of the ager ring is not refreshed.

FIG. 4 is a diagram of exemplary operations 400 capable of being performed by ager ring 300 when an entry of ager ring 300 is not refreshed. As shown, ager ring 300 may include buckets 310, entry 320, current time 330, and max timeout 340. Ager ring 300, buckets 310, entry 320, current time 330, and max timeout 340 may include the features described above in connection with, for example, FIG. 3.

As further shown in FIG. 4, network device 110 may determine whether a particular entry 410 (e.g., provided in bucket 310 labeled "6") in ager ring 300 is to be updated. Entry 410 may include the features described above for entry 320. It may further be assumed that ager ring 300 includes a refresh timeout 420 of ten (10) for entry 410 and a max timeout 340 of fourteen (14). Refresh timeout 420 may include a time period until entry 410 in ager ring 300 is refreshed. Since entry 410 is in bucket 310 labeled "6" and current time 330 is "1," entry 410 may have five (5) ticks (e.g., time intervals) left before entry 410 is deleted (e.g., aged out). Network device 110 may calculate a bucket offset 430 of entry 410 according to Equation (1), and may determine that bucket offset 430 of entry 410 is five (5) based on Equation (1) (i.e., 1+10−6=5).

Since bucket offset 430 is greater than zero, network device 110 may determine whether an update of entry 410 is needed based on Equation (3). Via equation (3), network device 110 may determine that four times the remaining time (e.g., Current Bucket−Current Time) of entry 410 (e.g., (6−1)×4=20) is greater than refresh timeout 420 (e.g., which equals "10"). Therefore, network device 110 may determine that entry 410 does not need to be updated, and may keep entry 410 in its original position (e.g., bucket 310 labeled "6"), as indicated by reference number 440. Network device 110 may update a bucket offset of entry 410.

Figure 5:
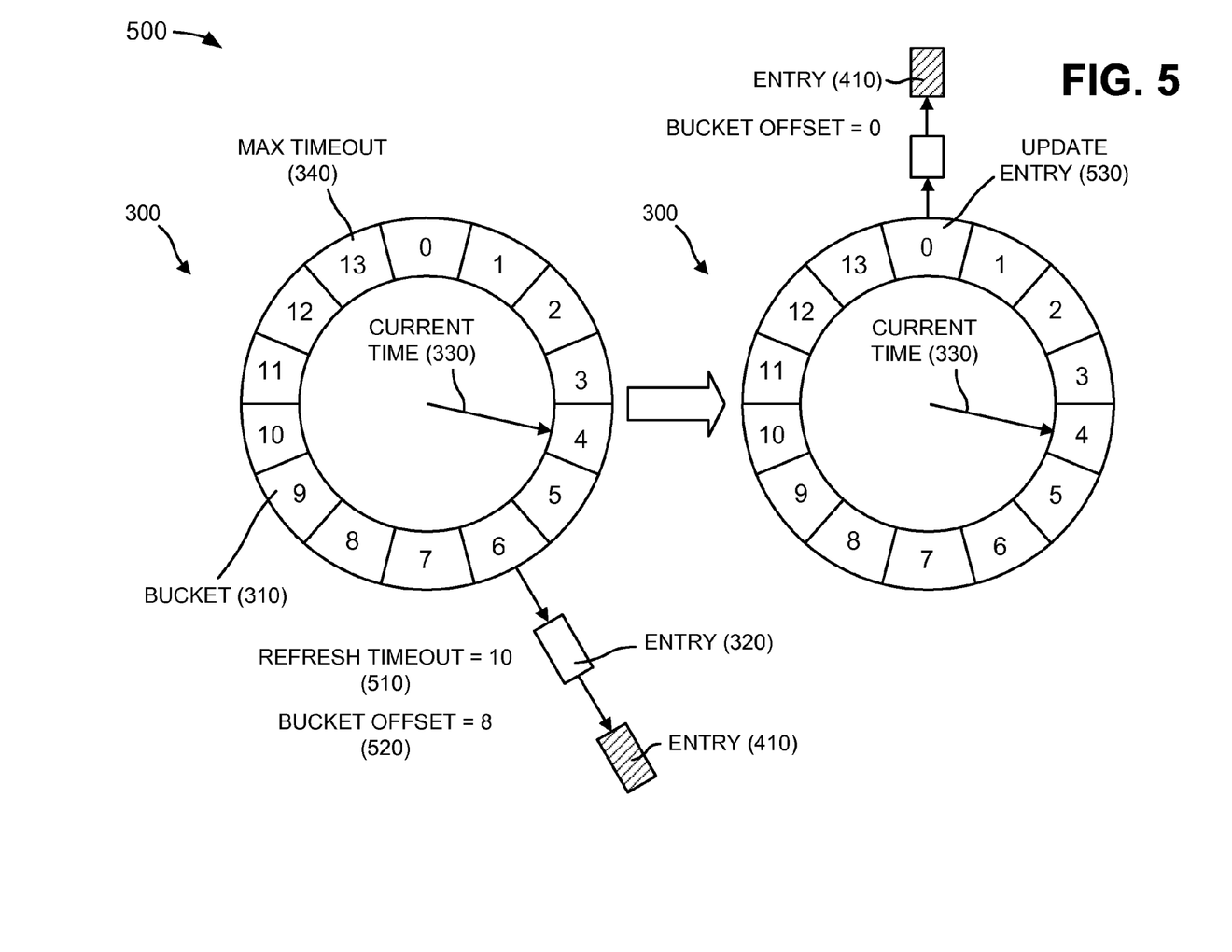
FIG. 5 is a diagram of exemplary operations capable of being performed by the ager ring when an entry of the ager ring is refreshed.

FIG. 5 is a diagram of exemplary operations 500 capable of being performed by ager ring 300 when entry 410 of ager ring 300 is refreshed. As shown, ager ring 300 may include buckets 310, entry 320, current time 330, max timeout 340, and entry 410. Ager ring 300, buckets 310, entry 320, current time 330, max timeout 340, and entry 410 may include the features described above in connection with, for example, FIGS. 3 and/or 4.

As further shown in FIG. 5, current time 330 may have advanced three ticks to bucket 310 labeled "4." Network device 110 may determine whether entry 410 (e.g., provided in bucket 310 labeled "6") in ager ring 300 is to be updated. It may further be assumed that ager ring 300 includes a refresh timeout 510 of ten (10) for entry 410. Since entry 410 is in bucket 310 labeled "6" and current time 330 is "4," entry 410 may have two (2) ticks (e.g., time intervals) left before entry 410 is deleted (e.g., aged out). Network device 110 may calculate a bucket offset 520 of entry 410 according to Equation (1), and may determine that bucket offset 520 of entry 410 is eight (8) based on Equation (1) (i.e., 4+10−6=8).

Since bucket offset 520 is greater than zero, network device 110 may determine whether an update of entry 410 is needed based on Equation (3). Via equation (3), network device 110 may determine that four times the remaining time (e.g., Current Bucket−Current Time) of entry 410 (e.g., (6−4)×4=8) is not greater than refresh timeout 510 (e.g., which equals "10"). Therefore, network device 110 may determine that entry 410 needs to be updated, and may update the position of entry 410 based on Equation (2) (e.g., where (Current Time+Refresh Timeout) % Max Timeout is (4+10) % 14, which equals zero). Thus, network device 110 may update entry 410 to bucket 310 labeled "0," as indicated by reference number 530.

Figure 6:
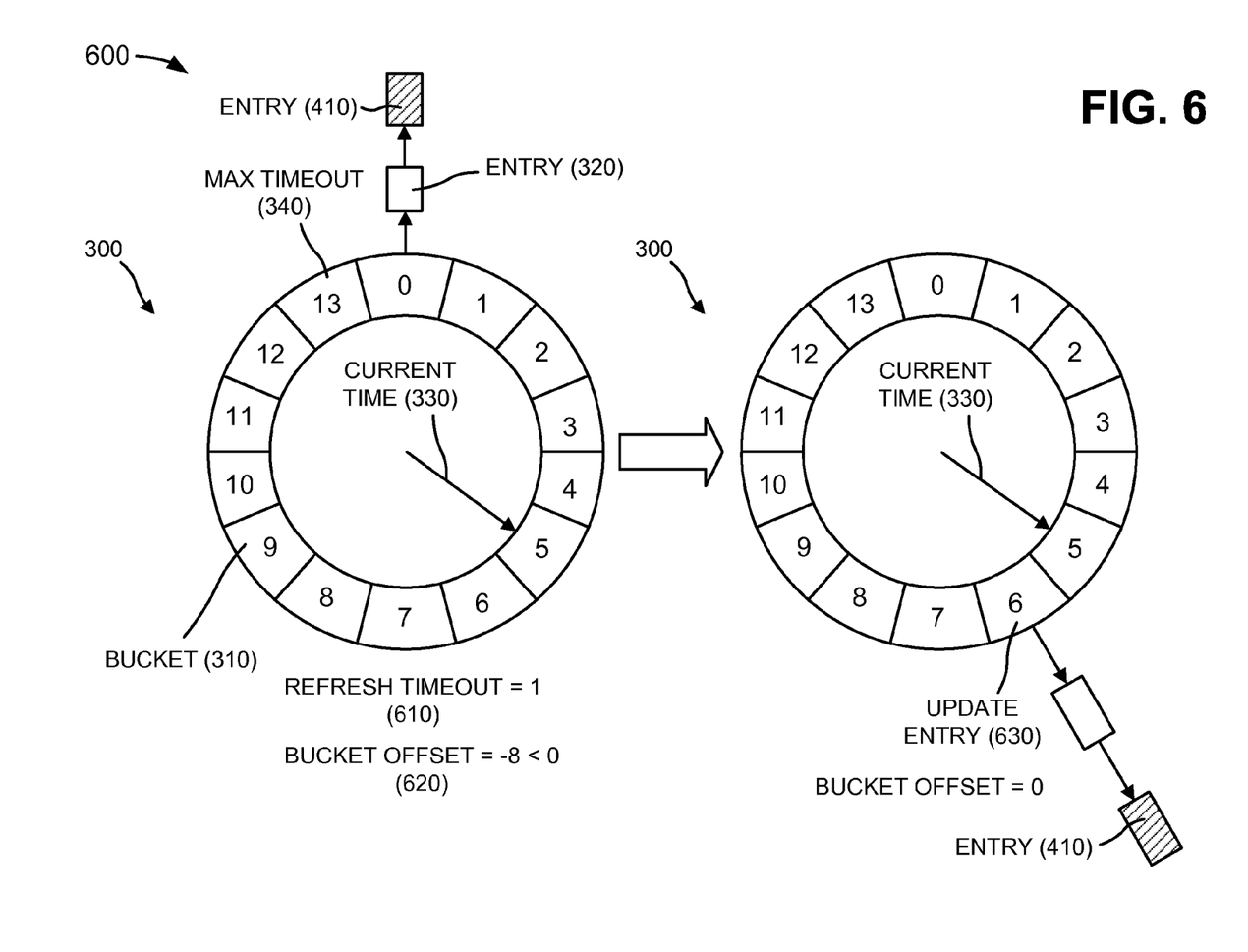
FIG. 6 is a diagram of exemplary operations capable of being performed by the ager ring when an entry of the ager ring is refreshed due to fast age out.

FIG. 6 is a diagram of exemplary operations 600 capable of being performed by ager ring 300 when entry 410 of ager ring 300 is refreshed due to fast age out. As shown, ager ring 300 may include buckets 310, entry 320, current time 330, max timeout 340, and entry 410. Ager ring 300, buckets 310, entry 320, current time 330, max timeout 340, and entry 410 may include the features described above in connection with, for example, FIGS. 3, 4, and/or 5.

As further shown in FIG. 6, current time 330 may have advanced one tick to bucket 310 labeled "5." It may be assumed that a fast age out of entry 410 will occur (e.g., due to receipt of a reset (RST) command for a session). Network device 110 may determine whether entry 410 (e.g., provided in bucket 310 labeled "0") in ager ring 300 is to be updated. It may further be assumed that ager ring 300 includes a refresh timeout 610 of one (1) for entry 410. Since entry 410 is in bucket 310 labeled "0" and current time 330 is "5" (i.e., Current Bucket<Current Time), network device 110 may determine "Current Bucket" to be the sum of "Current Bucket" and max timeout 340 (i.e., Current Bucket=0+14=14). Network device 110 may calculate a bucket offset 620 of entry 410 according to Equation (1), and may determine that bucket offset 620 of entry 410 is negative eight (−8) based on Equation (1) (i.e., 5+1−14=−8).

Since bucket offset 620 is less than zero, network device 110 may update the position of entry 410 based on Equation (2) (e.g., where (Current Time+Refresh Timeout) % Max Timeout is (5+1) % 14, which equals six). Thus, network device 110 may update entry 410 to bucket 310 labeled "6," as indicated by reference number 630. Network device 110 may set the bucket offset of entry 410 to zero (0) since entry 410 has been updated.

Figure 7:
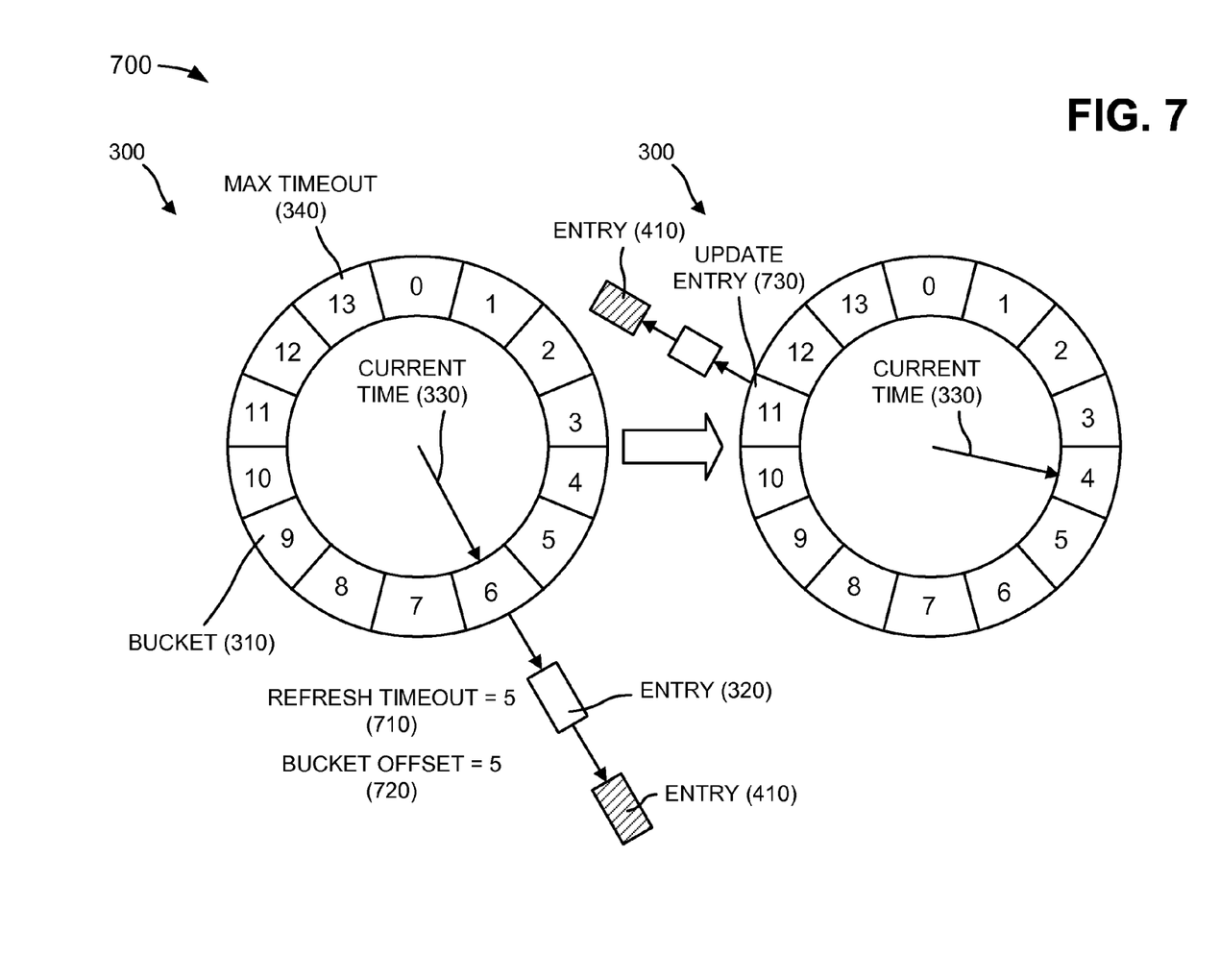
FIG. 7 is a diagram of exemplary operations capable of being performed by the ager ring when an entry of the ager ring is aged during a refresh.

FIG. 7 is a diagram of exemplary operations 700 capable of being performed by ager ring 300 when entry 410 of ager ring 300 is aged during a refresh. As shown, ager ring 300 may include buckets 310, entry 320, current time 330, max timeout 340, and entry 410. Ager ring 300, buckets 310, entry 320, current time 330, max timeout 340, and entry 410 may include the features described above in connection with, for example, FIGS. 3, 4, 5, and/or 6.

As further shown in FIG. 7, both entry 410 and current time 330 may be associated with bucket 310 labeled "6." Network device 110 may determine whether entry 410 in ager ring 300 is to be updated. It may further be assumed that ager ring 300 includes a refresh timeout 710 of five (5) for entry 410. Since entry 410 is in bucket 310 labeled "6" and current time 330 is "6," network device 110 may calculate a bucket offset 720 of entry 410 according to Equation (1), and may determine that bucket offset 720 of entry 410 is five (5) based on Equation (1) (i.e., 6+5−6=5).

Since bucket offset 720 is not zero and entry 410 is being aged, network device 110 may update the position of entry 410 based on Equation (4) (e.g., where (Current Time+Bucket Offset) % Max Timeout is (6+5) % 14, which equals eleven). Thus, network device 110 may update entry 410 to bucket 310 labeled "11," as indicated by reference number 730.

Although FIGS. 4-7 show exemplary operations capable of being performed by ager ring 300, in other implementations, ager ring 300 may perform different operations or additional operations than depicted in FIGS. 4-7.

Exemplary Process

Figure 8:
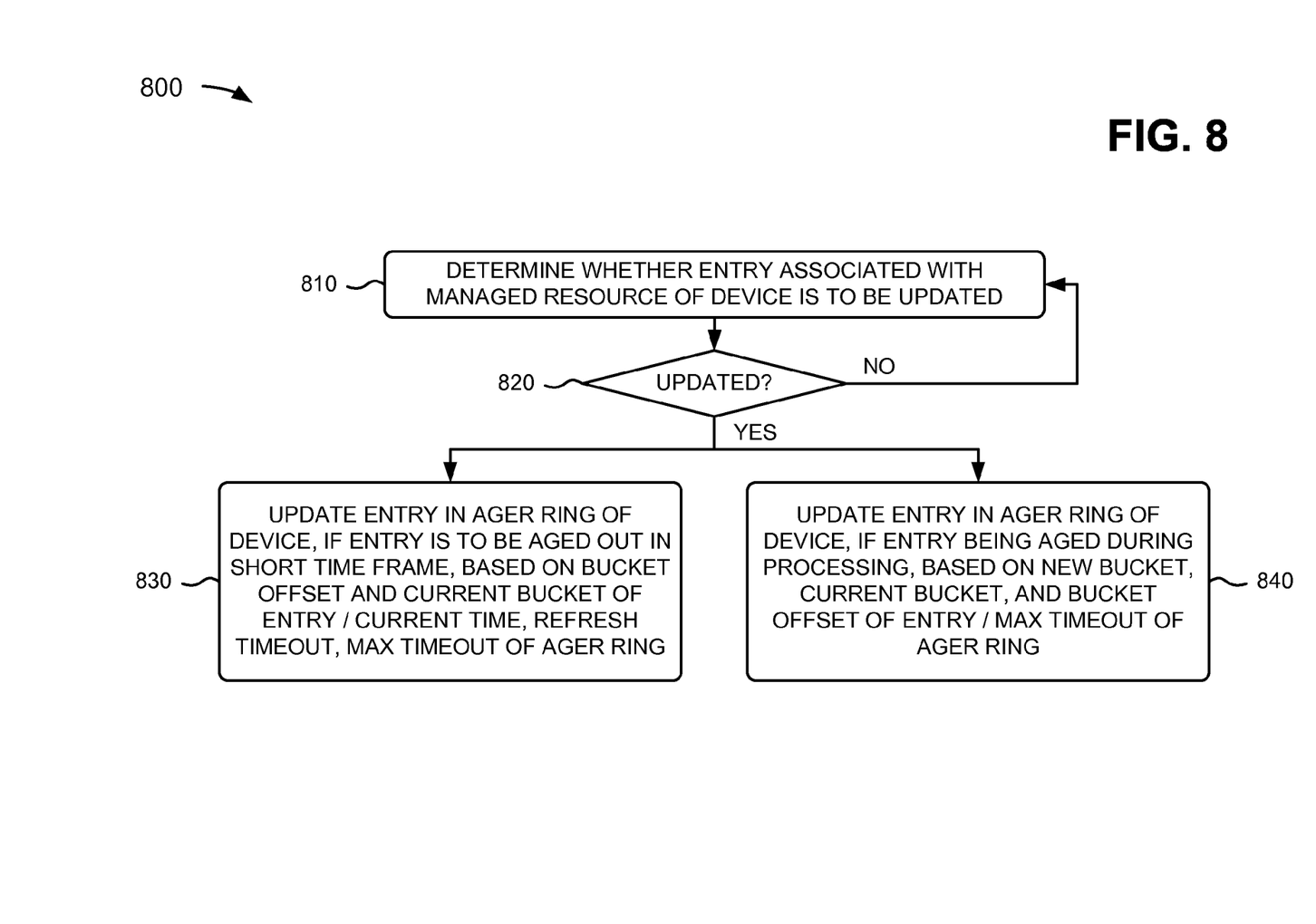
FIGS. 8-10 are flow charts of an exemplary process for refreshing entries in an ager ring according to implementations described herein.
Figure 9:
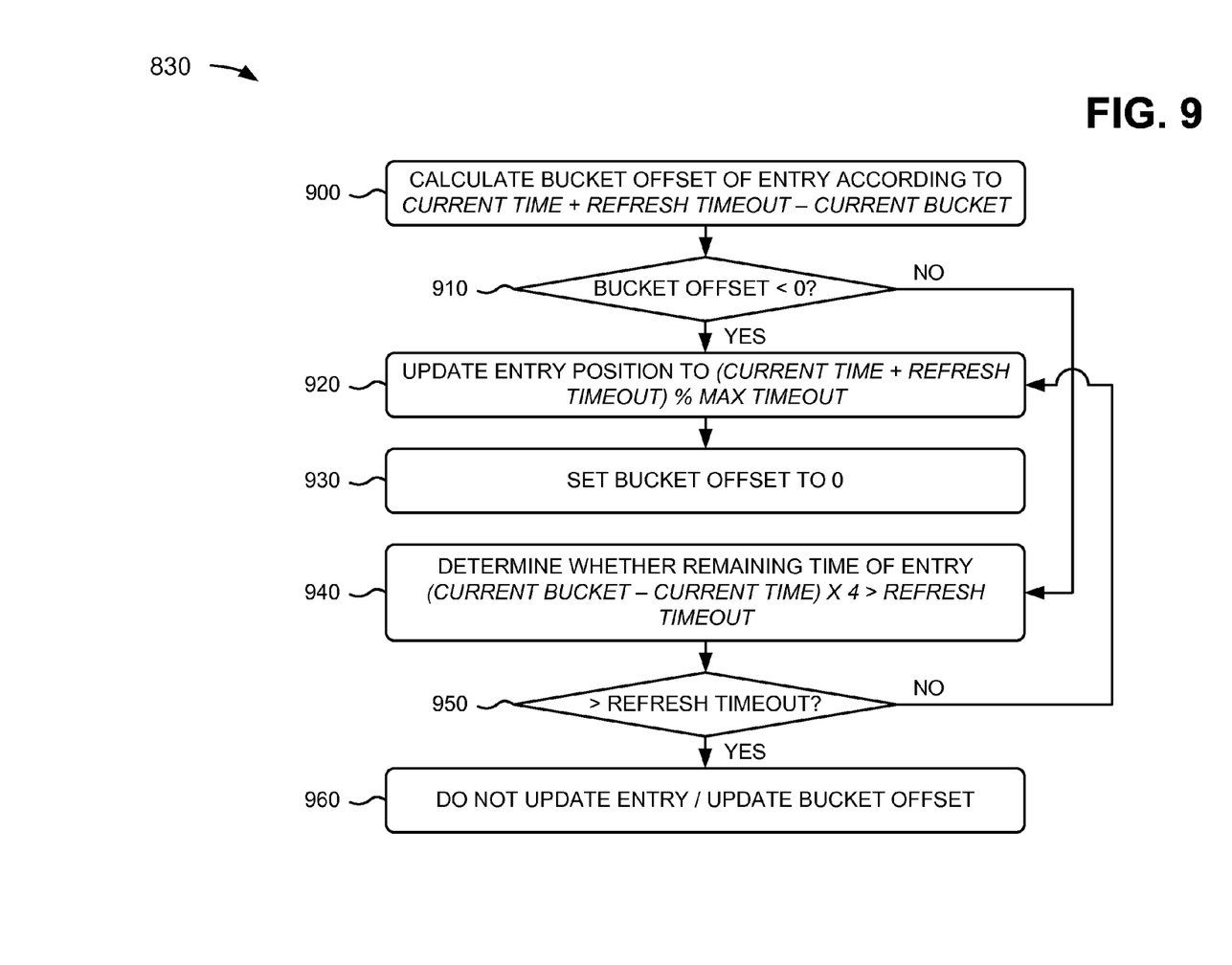
Figure 10:
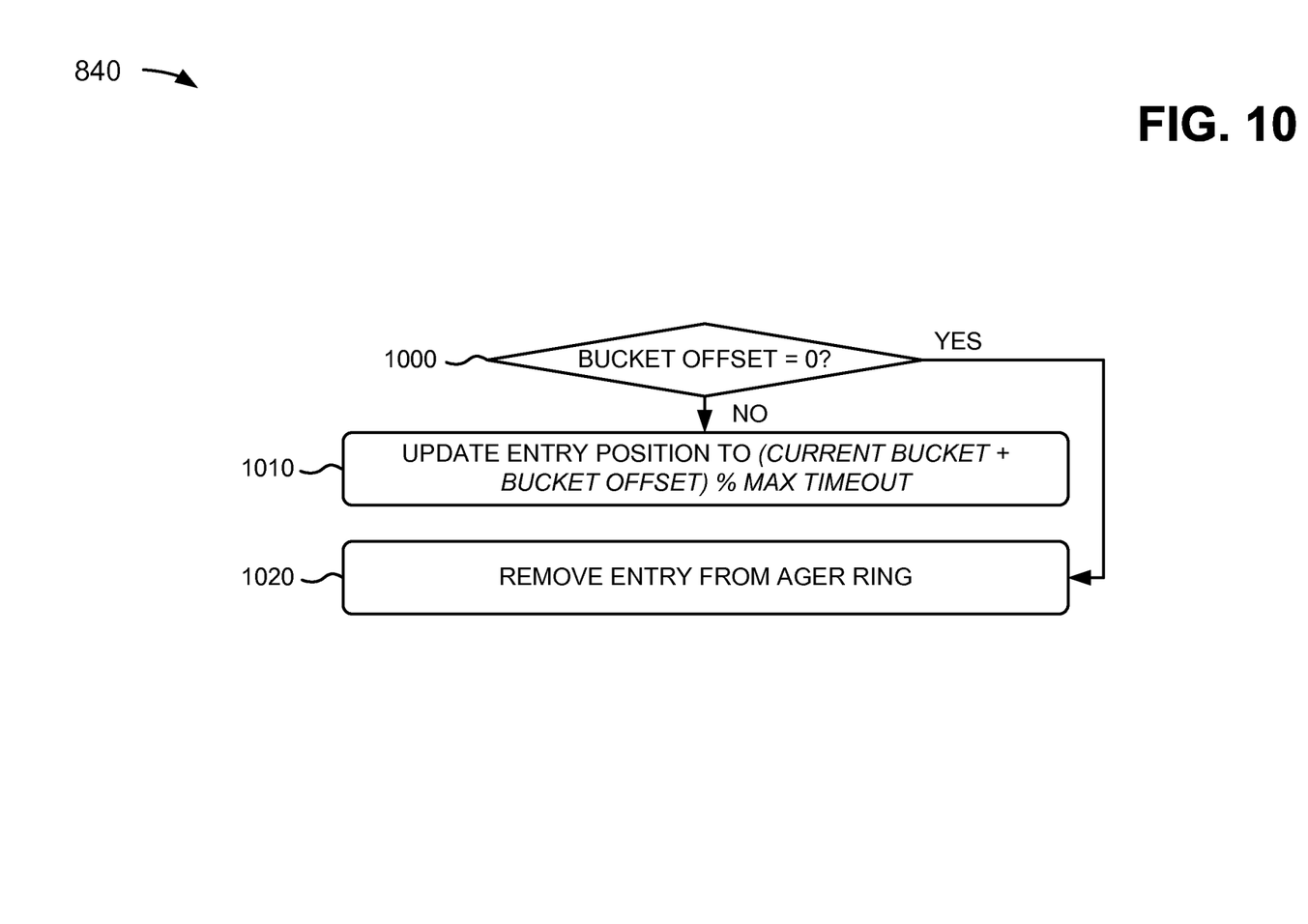

FIGS. 8-10 are flow charts of an exemplary process 800 for refreshing entries in an ager ring according to implementations described herein. In one implementation, process 800 may be performed by network device 110. In another implementation, some or all of process 800 may be performed by ager ring 300 of network device 110.

As illustrated in FIG. 8, process 800 may include determining whether an entry associated with a managed resource of a device is to be updated (block 810). If the entry is not to be updated (block 820—NO), process 800 may return to process block 810. For example, in implementations described above in connection with FIG. 3, network device 110 may determine whether an entry (e.g., entry 320) associated with a managed resource (e.g., a firewall session) of network device 110 is to be updated. If entry 320 is not to be updated, network device 110 may wait a particular time period and once again determine whether the entry is to be updated.

As further shown in FIG. 8, if the entry is to be updated (block 820—YES), process 800 may include updating the entry in an ager ring of the device, if the entry is to be aged out in a short time frame, based on a bucket offset and a current bucket of the entry and based on a current time, a refresh timeout, and a max timeout of the ager ring (block 830). For example, in implementations described above in connection with FIG. 3, network device 110 may determine that entry 320 is to be updated when entry 320 is being refreshed in ager ring 300 (e.g., when entry 320 is going to be aged out in a particular time period). Network device 110 may update entry 320 based on a variety of parameters, such as a bucket offset and a current bucket associated with entry 320, and/or current time 330, a refresh timeout, and max timeout 340 associated with ager ring 300.

Returning to FIG. 8, if the entry is to be updated (block 820—YES), process 800 may, alternatively, include updating the entry in the ager ring of the device, if the entry is being aged during processing, based on a new bucket, the bucket offset, and the current bucket of the entry and based on the max timeout of the ager ring (block 840). For example, in implementations described above in connection with FIG. 3, network device 110 may determine that entry 320 is to be updated when entry 320 is being processed for aging out in ager ring 300. Network device 110 may update entry 320 based on a variety of parameters, such as a new bucket, a bucket offset, and a current bucket associated with entry 320, and/or max timeout 340 associated with ager ring 300.

Process block 830 may include the process blocks depicted in FIG. 9. As shown in FIG. 9, process block 830 may include calculating the bucket offset of the entry according to Current Time+Refresh Timeout−Current Bucket (block 900). If the bucket offset is less than zero (block 910—YES), process block 830 may include updating the entry position to (Current Time+Refresh Timeout) % Max Timeout (block 920), and setting the bucket offset to zero (block 930). For example, in implementations described above in connection with FIG. 3, if entry 320 is being refreshed in ager ring 300, network device 110 may calculate a bucket offset of entry 320 according to Equation (1): Bucket Offset=Current Time+Refresh Timeout−Current Bucket. If the "Bucket Offset" calculated in Equation (1) is less than zero (0), network device 110 may update a position of entry 320 in ager ring 300 to a position according to Equation (2): (Current Time+Refresh Timeout) % Max Timeout, and may set the "Bucket Offset" of entry 320 to zero (0) (e.g., since entry 320 is updated).

As further shown in FIG. 9, if the bucket offset is greater than or equal to zero (block 910—NO), process block 830 may include determining whether four times a remaining time of entry (Current Bucket−Current Time) is greater than the refresh timeout (block 940). If four times the remaining time of entry is greater than the refresh timeout (block 950—YES), the entry may not be updated but the bucket offset of the entry may be updated (block 960). Otherwise (block 950—NO), process block 830 may return to process block 920. For example, in implementations described above in connection with FIG. 3, if the "Bucket Offset" calculated in Equation (1) is greater than or equal to zero (0), network device 110 may use Equation (3): (Current Bucket−Current Time)×4>Refresh Timeout to determine whether four times a remaining time (e.g., Current Bucket−Current Time) of entry 320 is greater than a particular amount of the "Refresh Timeout." If four times the remaining time of entry 320 is greater than the "Refresh Timeout," network device 110 may determine that entry 320 does not need to be updated, may update the "Bucket Offset" of entry 320, and may record the "Bucket Offset" of entry 320. If the remaining time of entry 320 is less than or equal to the "Refresh Timeout," network device 110 may proactively update entry 320 according to Equation (2), and may set the "Bucket Offset" of entry 320 to zero (0).

Process block 840 may include the process blocks depicted in FIG. 10. As shown in FIG. 10, process block 840 may include determining whether the bucket offset is equal to zero (block 1000). If the bucket offset does not equal zero (block 1000—NO), process block 840 may include updating the entry position to (Current Bucket+Bucket Offset) % Max Timeout (block 1010). If the bucket offset equals zero (block 1000—YES), the entry may be removed from the ager ring (block 1020). For example, in implementations described above in connection with FIG. 3, if entry 320 is being processed for aging out in ager ring 300 and the "Bucket Offset" of entry 320 is not equal to zero (0), network device 110 may update a position of entry 320 in ager ring 300 to a position (e.g., a "New Bucket") calculated according to Equation (4): New Bucket=(Current Bucket+Bucket Offset) % Max Timeout. After updating entry 320 to "New Bucket," network device 110 may set the "Bucket Offset" of entry 320 to zero (0). If entry 320 is being processed for aging out in ager ring 300 and the "Bucket Offset" of entry 320 equals zero (0), network device 110 may remove entry 320 from ager ring 300.

CONCLUSION

Implementations described herein may provide systems and/or methods that update an entry of an ager ring provided in a device, such as a network device. The systems and/or methods may reduce a time associated with an ager ring entry update by updating the entry if the entry is going to be aged out in a short time frame or if the entry is being processed for aging out. In one implementation, for example, the systems and/or methods may determine whether an entry associated a managed resource (e.g., a firewall session) of a device is to be updated. The systems and/or methods may determine that the entry is to be updated when the entry is being refreshed in an ager ring of the device or when the entry is being processed for aging out in the ager ring. If the managed resource is being refreshed, the systems and/or methods may update the entry in the ager ring based on a variety of parameters associated with the ager ring and/or the entry. If the entry is being aged during processing, the systems and/or methods may update the entry based on additional parameters associated with the ager ring and/or the entry.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, by a device, a plurality of entries associated with a timing mechanism, the plurality of entries being sorted based on respective first current time values,
   determining, by the device, a particular entry, of the plurality of entries, the particular entry being associated with a session;
   calculating, by the device, an offset value associated with the particular entry,
   the offset value being calculated based on:
      a first current time value, of the respective first current time values, associated with the particular entry, a second current time value associated with the timing mechanism in the device, and
a refresh timeout value associated with the timing mechanism;
updating, by the device, the particular entry,
the updating of the particular entry including:
associating a new first current time value with the particular entry,
the new first current time value being determined based on a remainder associated with dividing a sum of the offset value and the first current time value by a maximum timeout value associated with the timing mechanism, and
the particular entry being resorted, among the plurality of entries, based on the new first current time value; and
managing, by the device, the session based on resorting the particular entry.

2. The method of claim 1, where the updating occurs during a first time period, and where the method further comprises:
setting the offset value to zero after associating, the new first current time value with the particular entry, and
determining whether to update the particular entry during a second time period, that is subsequent to the first time period, based on the new first current time value and setting the offset value to zero.

3. The method of claim 1, further comprising:
receiving a user input defining a variable;
calculating a remaining time value, associated with the particular entry, based on a weighted difference between the new first current time value and the second current time value,
the difference being weighted based on the user input;
determining whether the remaining time value is greater than the refresh timeout value; and
updating the particular entry further based on determining whether the remaining time value of the particular entry is greater than the refresh timeout value.

4. The method of claim 3,
where associating the new first current time value with the particular entry further includes:
associating the new first current time value with the particular entry, when the remaining time value is less than or equal to the refresh timeout value.

5. The method of claim 1, further comprising:
determining whether the offset value equals zero; and
aging the particular entry, when the offset value equals zero, based on at least one of:
the new first current time value associated with the particular entry,
the first current time value,
the offset value, or
the maximum timeout value.

6. The method of claim 5, where aging the particular entry includes:
deleting the particular entry when the offset value equals zero, and
where managing the session includes:
terminating the session after deleting the particular entry.

7. The method of claim 1, where calculating the offset value further includes:
determining a sum of the second current time value and the refresh timeout value;
adjusting the sum by the first current time value; and
calculating the offset value based on the adjusted sum.

8. A device comprising:
a memory associated with a timing mechanism; and
a processor to:
store, in the memory, a plurality of entries, the plurality of entries including a particular entry associated with a session,
the plurality of entries being associated with respective first current time values, and
the plurality of entries being sorted based on the respective first current time values,
determine whether the particular entry is to be aged out during a time period, and
update when the particular entry is to be aged out during the time period, the particular entry,
the processor, when updating the particular entry, being further to:
determine a new first current time value, associated with the particular entry, based on a remainder from dividing a sum of an offset value associated with the particular entry and the respective first current time value associated with the particular entry by a maximum timeout value associated with the timing mechanism, and
update a position of the particular entry, in the sorted plurality of entries, based on the new first current time value,
manage the session based on the updated particular entry.

9. The device of claim 8, where the processor, when determining whether the particular entry is to be aged out during the time period, is further to:
determine whether data associated with the session is received during a current time period, and
determine to age out the particular entry, during the time period, based on whether the data is received during the current time period.

10. The device of claim 8, where the processor is further to:
calculate the offset value based on:
the respective first current time value,
a refresh timeout value associated with the timing mechanism, and
a second current time value associated with the timing mechanism.

11. The device of claim 8, where, the processor, when determining whether the particular entry is to be aged out during the time period, is further to:
calculate a remaining time value, associated with the particular entry, based on a weighted difference between the respective first current time value and a second current time value associated with the timing mechanism,
determine whether the remaining time value is greater than a refresh timeout value associated with the timing mechanism, and
determine not to age out the particular entry when the remaining time value is greater than the refresh timeout value.

12. The device of claim 8,
where the processor, when updating the particular entry, is further to:
set the offset value to zero after updating the position of the particular entry in the sorted plurality of entries, and
determine whether to update the particular entry during another time period, that is subsequent to the time period, based on:
updating the position of the particular entry, and
setting the offset value to zero.

13. The device of claim 8, where the processor, when updating the particular entry, is further to:
   determine whether the offset value equals zero,
   age the particular entry, when the offset value does not equal zero, based on at least one of:
      the new first current time value associated with the particular entry,
      the respective first current time value,
      the offset value, or
      the maximum timeout value, and
   delete the particular entry when the offset value equals zero.

14. The device of claim 8, where the device comprises one or more of:
   a gateway,
   a router,
   a switch,
   a firewall,
   a network interface card (NIC),
   a hub,
   a bridge,
   a proxy server, or
   an optical add-drop multiplexer (OADM).

15. The device of claim 8, where the processor, when updating the position of the particular entry, in the sorted plurality of entries, is further to:
   update the position of the particular entry, in the sorted plurality of entries, further based on at least one of:
      a second current time value associated with the timing mechanism, or
      a refresh timeout value associated with the timing mechanism.

16. A non-transitory computer-readable medium to store instructions, the instructions comprising:
   one or more instructions which, when executed by a processor, cause the processor to store, in association with a timing mechanism, a plurality of entries related to a respective plurality of sessions;
   one or more instructions which, when executed by the processor, cause the processor to determine whether a particular entry, of the plurality of entries, is to be aged or aged out during a current time period, the particular entry being associated with a particular session of the respective plurality of sessions;
   one or more instructions which, when executed by the processor, cause the processor to update, when the particular entry is to be aged out during a particular time period, the particular entry,
      the one or more instructions to update the particular entry including:
         one or more instructions to determine a new first current time value, associated with the particular entry, based on a remainder from dividing a sum of an offset value associated with the particular entry and a first current time value associated with the particular entry by a maximum timeout value associated with the timing mechanism;
   one or more instructions which, when executed by the processor, cause the processor to manage the particular session based on the new first current time value associated with the particular entry.

17. The non-transitory computer-readable medium of claim 16, further comprising:
   one or more instructions to calculate the offset value based on:
      the first current time value,
      a refresh timeout value associated with the timing mechanism, and
      a second current time value associated with the timing mechanism.

18. The non-transitory computer-readable medium of claim 16, where the one or more instructions to update the particular entry further include:
   one or more instructions to sort the plurality of entries based on respective first current time values associated with the plurality of entries,
      the respective first current time values including the first current time value associated with the particular entry;
   one or more instructions to determine whether the offset value equals zero;
   one or more instructions to update a position of the particular entry, in the sorted plurality of entries, based on the new first current time value; and
   one or more instructions to remove the particular entry from the timing mechanism when the offset value equals zero.

19. The non-transitory computer-readable medium of claim 16, where the one or more instructions to update the particular entry further include:
   one or more instructions to sort the plurality of entries based on respective first current time values associated with the plurality of entries;
   one or more instructions to update, when the offset value is less than zero, a position of the particular entry, in the sorted plurality of entries, based on the new first current time value; and
   one or more instructions to set the offset value to zero after updating the position of the particular entry.

20. The non-transitory computer-readable medium of claim 16, where the one or more instructions to update the particular entry further include:
   one or more instructions to calculate a remaining time value, associated with the particular entry, based on a weighted difference between the first current time value and a second current time value associated with the timing mechanism;
   one or more instructions to determine whether the remaining time value is greater than a refresh timeout value associated with the timing mechanism;
   one or more instructions to update, when the remaining time value is not greater than the refresh timeout value, the particular entry further based on at least one of:
      the second current time value,
      the refresh timeout value, or
      the maximum timeout value; and
   one or more instructions to set the offset value to zero after updating the particular entry.

* * * * *